(12) United States Patent
Kesselring

(10) Patent No.: US 8,498,929 B2
(45) Date of Patent: Jul. 30, 2013

(54) SYSTEM, METHOD AND COMPUTER PROGRAM STORAGE DEVICE FOR DETECTING SHORT SALE FRAUD

(75) Inventor: Felice Kesselring, Santa Ana, CA (US)

(73) Assignee: Corelogic Solutions, LLC, Santa Ana, CA (US)

( * ) Notice: Subject to any disclaimer, the term of this patent is extended or adjusted under 35 U.S.C. 154(b) by 0 days.

(21) Appl. No.: 13/231,579

(22) Filed: Sep. 13, 2011

(65) Prior Publication Data

US 2012/0078778 A1 Mar. 29, 2012

Related U.S. Application Data

(60) Provisional application No. 61/383,238, filed on Sep. 15, 2010.

(51) Int. Cl.
*G06Q 40/00* (2006.01)

(52) U.S. Cl.
USPC ....... 705/38; 705/37; 705/80; 705/4; 705/316

(58) Field of Classification Search
USPC .................................. 705/36–38, 80, 316, 4
See application file for complete search history.

(56) References Cited

U.S. PATENT DOCUMENTS

| | | | | |
|---|---|---|---|---|
| 2007/0244781 | A1* | 10/2007 | Ronk | 705/35 |
| 2010/0241558 | A1* | 9/2010 | Chmielewski et al. | 705/38 |
| 2011/0078086 | A1* | 3/2011 | Byrne | 705/316 |
| 2011/0258101 | A1* | 10/2011 | Albertelli et al. | 705/37 |

* cited by examiner

*Primary Examiner* — Harish T Dass
(74) *Attorney, Agent, or Firm* — Oblon, Spivak, McClelland, Maier & Neustadt, L.L.P.

(57) ABSTRACT

A short sale monitoring system, method and computer program product assist in identifying potential fraudulent activity associated with short sale real estate transactions. A processing circuit receives property identification information for a property, a short sale notification regarding a short sale of the property, and a short sale price. The processing circuit then queries a database of loan records to identify a corresponding loan application for the property. The loan application is at least one of a pending loan application and a closed loan application for the property. The processing circuit then generates a notice when (1) the short sale price is less than a predetermined amount with respect to a price included in the loan application, and (2) a date of the loan application is within a predetermined time of a closing date of the short sale.

20 Claims, 6 Drawing Sheets

| 30 | 32 | 34 | 36 | 38 | 40 | 42 | 44 | 46 | 48 | 50 | 52 | 54 |
|---|---|---|---|---|---|---|---|---|---|---|---|---|
| Alert # | Lender | Address | City | State | Zip Code | Loan Amount | Sale Price | Loan Status | Last Status Date | Expected Lien Position | Closing Date | Loan Purpose |

Figure 2

SYSTEM, METHOD AND COMPUTER PROGRAM STORAGE DEVICE FOR DETECTING SHORT SALE FRAUD

CROSS REFERENCE TO RELATED APPLICATION

The present application claims the benefit of the earlier filing date of U.S. Provisional Patent Application Ser. No. 61/383,238, filed Sep. 15, 2010, the entire contents of each of which is being incorporated herein by reference.

BACKGROUND

1. Technical Field

The present disclosure relates to systems, methods and computer program product that monitor real property transaction data, and detects signs of potential improper activity. In particular, the system, method and computer program product 2. Description of the Related Art A homeowner who is unable to pay their mortgage and is "underwater", i.e. the home is worth less than the amount the homeowner mortgage, may seek a lender's permission for a "short sale". A short sale of real estate occurs when the sale proceeds fall short of the balance owed on the property's loan. Often the lender decides that selling the property at a moderate loss is better than pressing the borrower who is already underwater and may not be able to afford the mortgage. Both parties consent to the short sale process because it allows them to avoid foreclosure, which involves hefty fees for the bank and poorer credit report outcomes for the borrowers. This agreement, however, does not necessarily release the borrower from the obligation to pay the remaining balance of the loan, known as the deficiency.

As the number of "short sales" has increased, so has the number of fraudulent activities related to "short sales". A common technique usually involves real estate insiders (i.e. real estate agents/brokers) who broker a short sale between the servicer and a buyer who serves as a middleman at a below-market value. The insider subsequently brokers a quick resale of the property from the middleman to an arms-length buyer at market value. It is common to observe re-sales occur as soon as one day after the short sale closes with the original servicer. Because the real estate broker does not disclose to the servicer the higher value offer that should be available to them from the arms-length buyer, they are defrauded out of receiving the best price possible.

SUMMARY

The present disclosure relates to a system, method and computer program product of detecting potentially fraudulent activity regarding a short sale. The system may be provided by a business entity or "analytics provider" that provides various services to its customers for assessing risk levels associated with real estate transactions (e.g., short sale) and other types of transactions. The system includes a set of analytics applications that are accessible over a network (such as the Internet) via a customer interface that allow for the automatic tracking of pre-closing transactions as well as post-closing monitoring of ownership turnover. When a particular property is detected as being sold or offered for sale within a short time after a short sale, and this subsequent sale/offer is substantially more than the short sale price, an alert is generated, providing notice of a potential improper or fraudulent transaction.

The customer interface may, for example, include a web site, an extranet, a web services interface, and/or any other type of interface that enables customers to remotely access and use the applications via their computing devices (desktop computers, mobile phones, servers, etc.). Typical customers of the system include mortgage lenders, other types of lenders, mortgage servicers, real estate investors, and property insurance companies.

All of the processes and process steps described above may be embodied in, and fully automated via, software code modules executed by one or more general purpose computers, servers, or other types of computing machines. The code modules may be stored in any type of non-transitory computer-readable medium or other computer storage or storage device. Some or all of the methods or steps may alternatively be embodied in specialized computer hardware. The results of the disclosed methods and tasks may be persistently stored by transforming physical storage devices, such as solid state memory chips and/or magnetic disks, into a different state.

Thus, all of the methods and tasks described herein may be performed and fully automated by a programmed or specially configured computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other computer-readable storage medium. Where the system includes multiple computing devices, these devices may, but need not, be co-located.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 is a data structure showing the format of an alert generated by the system of FIG. 1;

FIG. 1 is a block diagram of a system for detecting short sale fraud in pre-closing activities. The system includes an interface 10 that receives, from a loan servicer, pending short sale information regarding a particular property. The information includes property identification (such as a parcel ID, property address), as well as loan amount, or proposed short sale price, an indicator of the sale being a short sale, sale date, buyer and seller identifiers. The information received through the interface 10 is then provided to a short sale processor 12. The processor includes a processing circuit (programmable, preconfigured or hybrid) that makes a query to loan application consortium database 16 to see if there is a match between the short sale property address against pending and closed loan applications submitted to the loan application consortium database 16. Moreover, the loan application consortium database 16 includes pending and closed loan applications for properties in a predetermined geographic region, such as a local region, state or even national level. The short sale processor 12 checks whether the matching record, if it exists, was submitted within a predetermined time, such as within 45 days, measured from the proposed short sale date's closing. Also, the short sale processor 12 checks whether the loan amount and/or estimated sales price of the loan is greater than a predetermined percentage of the proposed sale price, such as 3%. Forty-five days and 3% are merely two criteria however other values may be used anywhere from 15 days, to 6 months, and 1% to 10% as an example. When the matching record was submitted within the previous 45 days until the short sale was closed and the loan amount and/or sales estimated sale amount of the loan is greater than 3% of the proposed short sale price, the short sale processor 12 sends a signal to an alert generator 14 that generates an alert of the suspicious activity.

Figure 1:
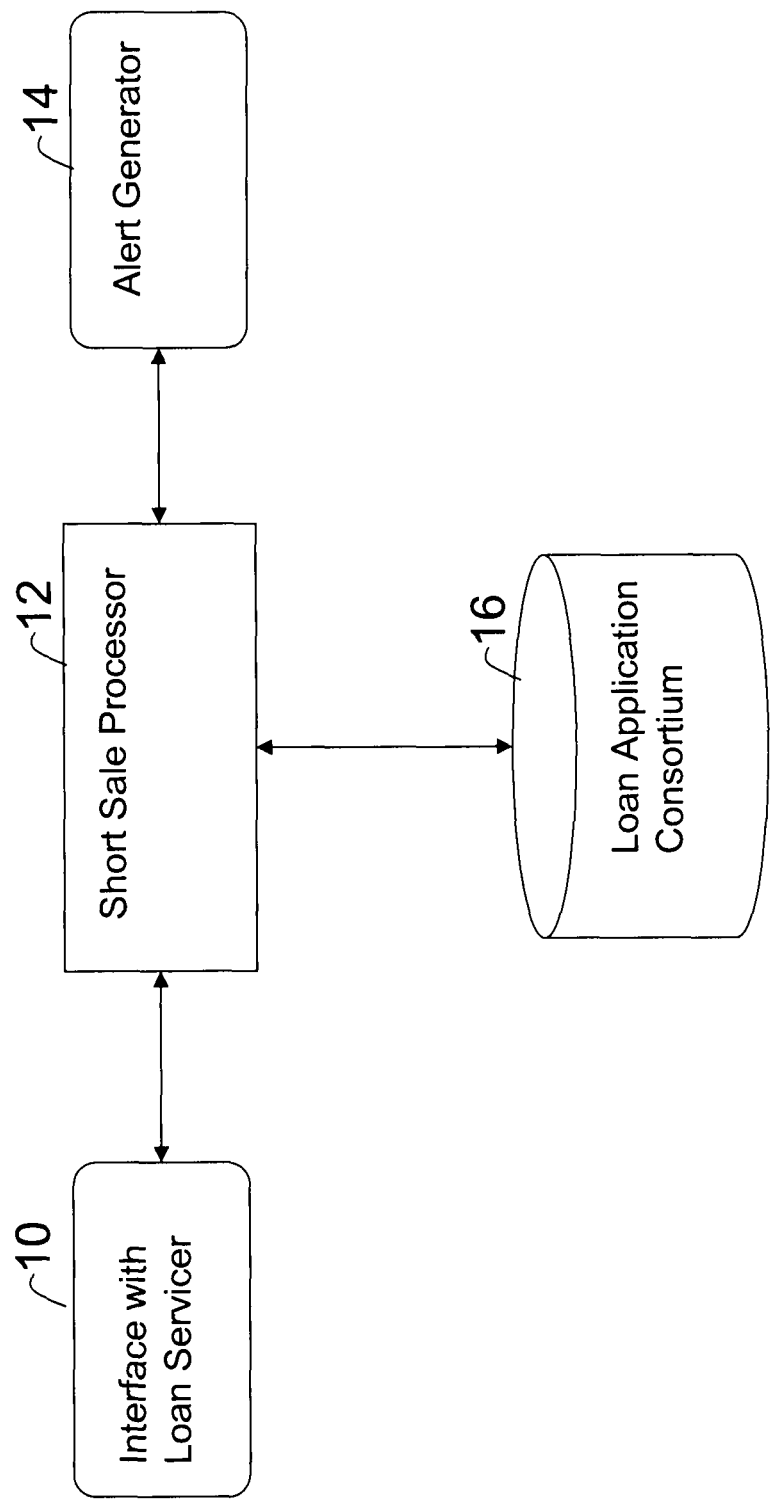
FIG. 1 is a block diagram of a system for detecting actual or potential pre-closing short sale fraud according to one embodiment.

A suspicious transaction may be one in which the new transaction is made less than one month, for example, after the short sale where the new sales prices is at least $10,000 or 10% higher than a short sale price. Alternatively, other suspicious transaction may be one where the transaction is less than three months after the short sale or where the new sale price is $20,000 or 20% higher than the short sale price. Alternatively, the suspicious transaction may be one where the new transaction is less than six months after the short sale where the new sale price is at least $40,000 or 40% higher than the short sale price. While specific values are provided herein, it should be understood that the parameter of time governs the threshold (dollar or percent), where the deviation from the short sale price and subsequent sale price, triggers identification of a suspicious event.

One example of a scenario that would generate an alert from the alert generator 14 would be indication of a short sale fraudulent activity. As an example, based on the public records, a foreclosure of a particular property may be evident from an unpaid balance for a property of over $600,000 for example. Then, a particular company buys that property for $400,000 on a particular day, such as March 16 and the recording of the sale is performed on March 24. Then, that same company sells (and based on the recordings in the public database or loan application consortium) the same property to an individual for $510,000 on March 16, with the recording of that sale on March 25. A mortgage amount of $408,000 would also be recorded as financing information. Thus this scenario describes fraudulent activity since the company buys the property for well below the unpaid balance of the original loan, and then on the same day "flips" the property for a sale price of $110,000 above purchase price where the company flipped the house in one day.

Moreover, for example, if Bank A submits a short sale offer for $400,000 on 123 Main Street, the system would search the loan database for all pending loan applications on 123 Main Street. Assuming that the bank wants to be alerted whenever an offer of more than a predetermined amount (such as a fixed percentage in the inclusive range of 1% through 15% of the offer price) is made any time before the short sale closes, the system the iteratively monitors the databases searching for any loan applications which meet the Banks criteria, i.e. a loan application and/or sale of $440,000 or more for 123 Main Street until the short sale application was finally closed. The duration could also be user defined to begin at any time.

A user may provide the information in batch form, e.g. html, ftp site download, enter it manually in a graphical user interface or other types of submissions. In an exemplary embodiment the system is able to standardize the data to put it in a common format which may be easily searchable and also in a format which the data is coded to match the various data elements which have a relationship.

The system would also keep a record of various parties involved in "fraudulent activities" and store it in the system. This would allow the user to use additional information as a method of detecting fraud. For example, the system would record names of parties to the transactions so they can be monitored for potentially fraudulent activities. This way the system could attempt to detect patterns of fraudulent activity where various parties have collaborated to attempt a fraudulent transaction. For example, the system could find that on 2 or more real estate transactions (on the same property or different properties) the same parties were involved and at least on one of those transactions the system detected either a fraudulent activity or a potentially fraudulent activity.

It should be appreciated that the present system and method can be used for both pending sales and also for post closing activity. For example, if a fraudulent short sale "flip" is not detected before the short sale closes, identifying a suspicious resale after closing still allows a servicer to identity any industry insiders or middlemen who are perpetrating the fraud. Servicers can choose to prohibit future business relationship or short sale offers related to persons identified as having perpetrated fraud in the past. Moreover, the system and method as described herein may continue its monitoring and reporting activity for a predetermined period of time after the short sale closing date. For example, the monitoring and reporting may be set to expire 90 days after the short sale, although other expiration periods can be user-adjustable. For consistency, the monitoring/reporting expiration period may be set to a same date as the term of a "clawback provision" set in the short sale settlement documents.

FIG. 2 is a data structure showing sample content of a message alert. The content includes an alert number 30, lender name 32, address 34, city 36, state 38, zip code 40 and loan amount 42. A sale price 44 is included as well as loan status (e.g., pending, or documents in preparation), last status date 48, expected lien position, closing date 52 and loan purpose 54 (e.g., purchase, short sale). The loan purpose 54 can serve as an indicator of whether a particular sale is subject of a short sale. The message may be sent in any one of a variety of formats including e-mail, response to web query, client computer (or smartphone) request, facsimile, etc. The alert may also be generated in a report format, so the alert is one of a set of alerts for a portfolio of properties that were the subject of a batch query process.

Figure 3:
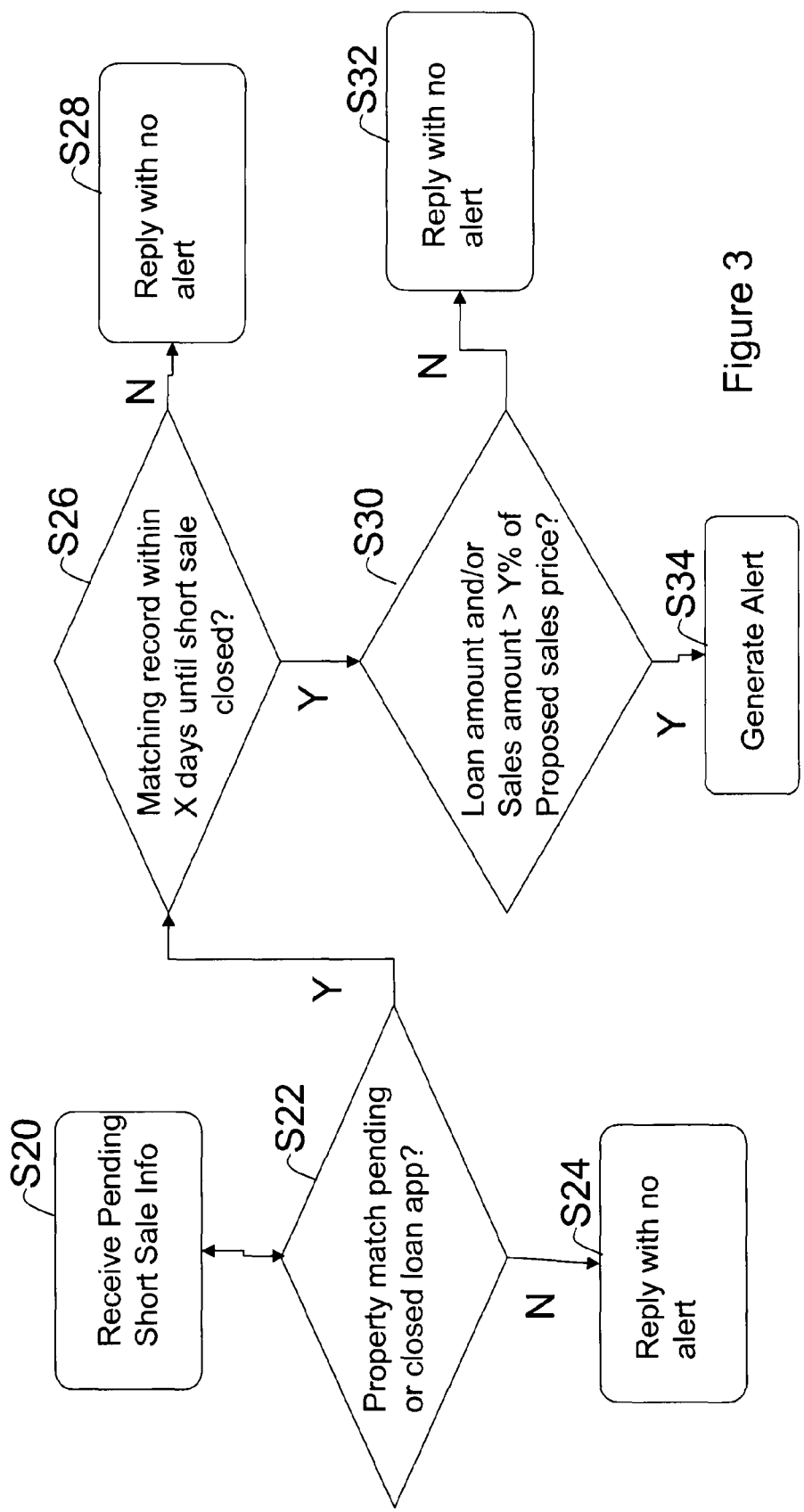
FIG. 3 is a flow diagram of a process for detecting short sale in a pre-closing setting.

FIG. 3 is a flow chart showing a process of a pre-closing short sale method performed according to the present embodiment. The process begins at step S20 where pending short sale information is received from a loan servicer. That information may include property information such as a complete property address as well as the proposed short sale price. One or a set of properties may be included in the request. If a set of properties is included, the properties are evaluated sequentially, although parallel processing may also be used if sufficient instances of the software processes are available. Also included in the input information is loan information such as the loan number, short sale status (pending/closed), where the final status may be send whether the short sale was closed or canceled. Also included is the status date and the unpaid balance. Optionally other information may be included as well such as the borrowers names, buying/selling agent, title/escrow companies, settlement agents, appraiser and appraisal amount.

Subsequently, the process proceeds to step S22 where a query is made regarding whether a property match exists with either a pending or closed loan application. The match is based on a query made to the loan application consortium which is either a private or a public database. One exemplary loan application consortium is that hosted by CoreLogic, the present assignee. The CoreLogic loan application consortium includes approximately 70% of all loan applications submitted each month. If the response to the query in step S22 is negative, indicating that there is no match, then the process proceeds to step S24 where it is determined that no reply needs to be sent. Alternatively if the response to the query in step S22 is affirmative, the process proceeds to step S26 where another query is made regarding whether the matching record is within a certain number of days until the short sale is closed. In one example, the time frame (X days) is 45 days, although the present process flow is not limited to 45 days and can range anywhere from 15 days to 6 months, for example. If the response to the query in step S26 is negative, the process proceeds to step S28 where either a confirmation reply is sent with no alert, or no reply is sent at all. However, if the response to the query in step S26 is affirmative, the process proceeds to another query in step S30. This second query determines whether the loan amount and/or sale amount is greater than a predetermined percentage of the proposed sale price. In the exemplary embodiment 3% is used as a threshold. However the present process is not so limited and the threshold may range from 1% to 10% for example. If the response to the query in step S30 is negative, the process proceeds to step S32 where either a confirmation reply is sent with no alert, or no reply is sent at all. Alternatively, if the response to the query in step S30 is affirmative, then an alert is generated step S34 and transmitted to the loan servicer, or other querying entity so as to notify them of the potentially fraudulent activity. Alternatively, the alert may also be sent to governmental agencies, or government sponsored agencies such as Fannie Mae and Freddie Mac, so as to assist in enforcement against the fraudulent activity.

Figure 4:
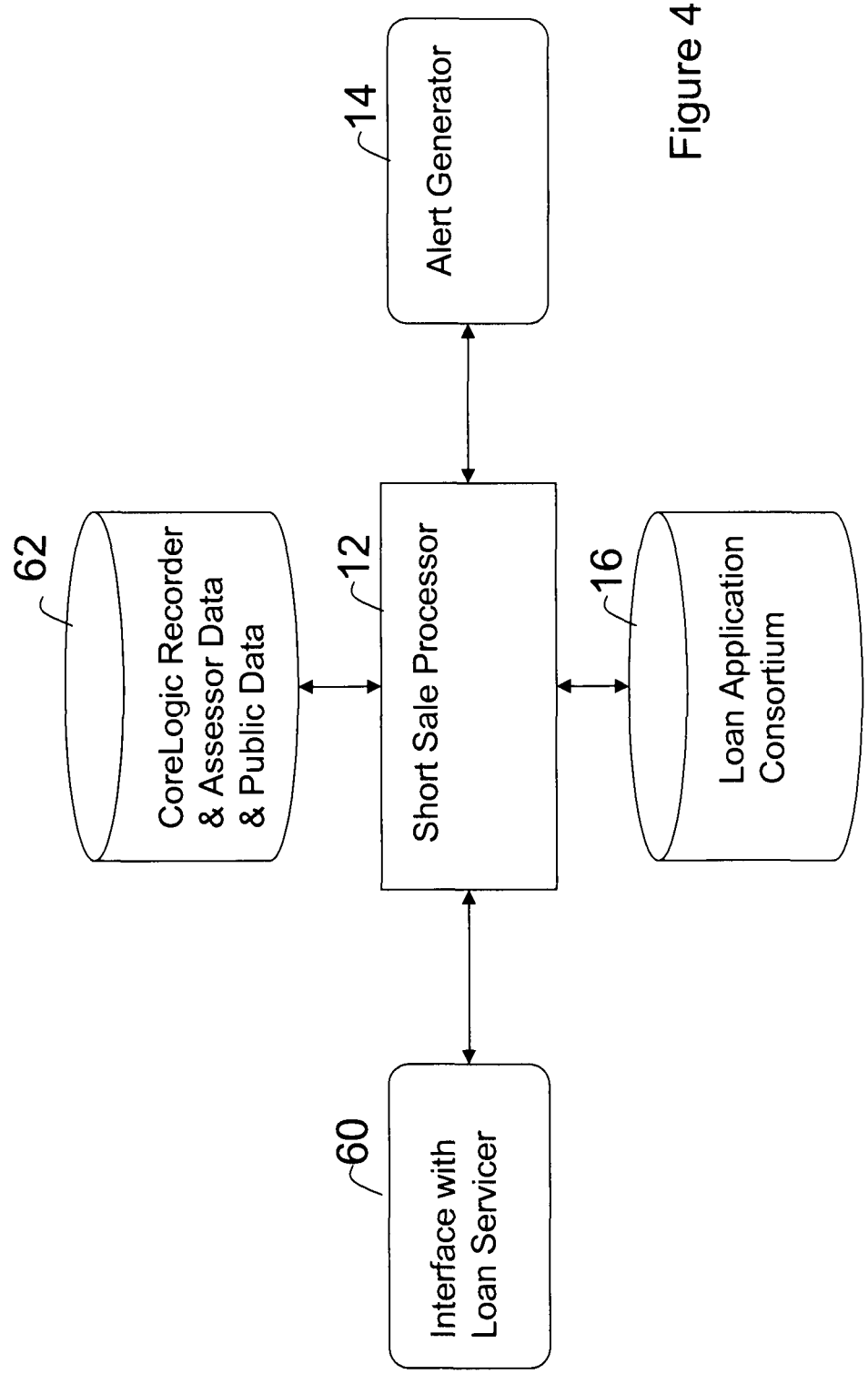
FIG. 4 is a block diagram of a system for detecting post-closing short sale.

FIG. 4 is a system that may be employed for detecting potentially fraudulent activity in post-closing short sale scenarios. An interface 60 is used to receive, from a loan servicer, information regarding the disposition of a final short sale. This information may be held in a closed short sale database. Once the short sale has been closed, the address associated with that short sale may be monitored for post-closing activity. The short sale processor 12 queries not only the loan application consortium for matches, but also checks CoreLogic's recorder and assessor database, as well as public records databases, which include 99% of all U.S. properties and 97% of all real estate sales transactions. The short sale processor, after querying the CoreLogic recorder and assessor database and public database 62, along with the loan consortium database 16, then determines if a matching record is found within a predetermined amount of time of the closing and is different than the closed short sale. As an example a predetermined period of time could be 90 days. If the matching record is found within the 90 days of closing and is different from the closed short sale, then the short sale processor 12 triggers the loan generator 12 to generate an alert message to report the potentially fraudulent activity.

Figure 5:
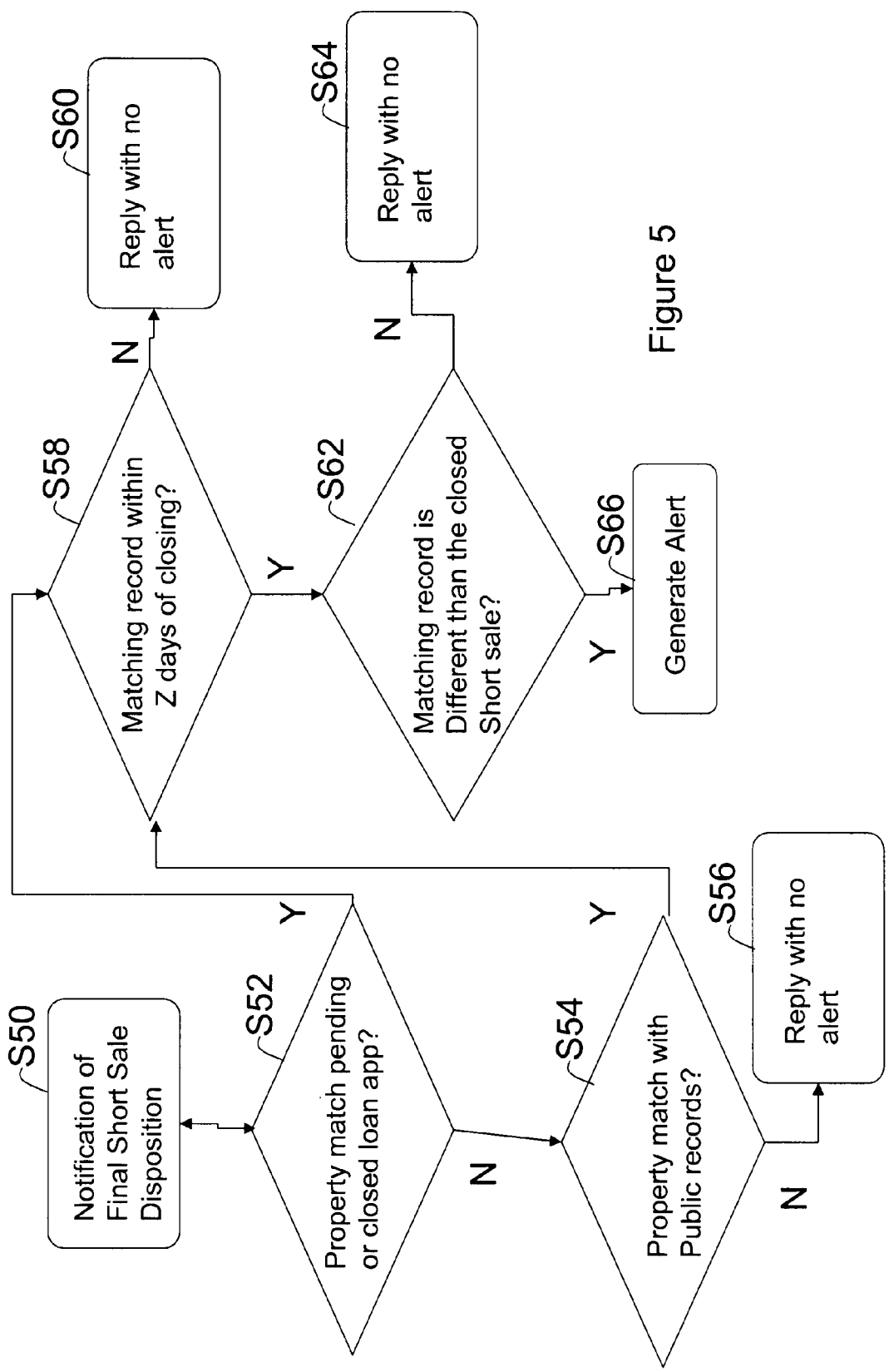
FIG. 5 is a flow chart of a post-closing short sale method according.

FIG. 5 is a flow chart showing a process flow for detecting post-closing short sale potentially fraudulent activity. The process begins in step S50 where notification of a final short sale disposition is received. The information from step S50 is provided to a query in step S52 where it is determined whether a property matches a pending or a closed loan application. A query is made with the CoreLogic loan application consortium database. If the response to the query in step S52 is negative, the process proceeds to step S54 where the property match is checked with public records database. It should be noted that while queries S52 and S54 are done in series, the queries may be made in parallel. The main idea is to check both databases to determine whether or not there is a match. If the response to the query in step S54 is negative, then a confirmation reply is sent with no alert, or no reply is sent at all in step S56. However, if the responses to the queries in step S52 and S54 are affirmative, the process proceeds to another query in step S58. In step S58 a query is made regarding whether the matching record is found within 90 days of the closing. While the specific number of 90 days is provided as an example, this threshold can be more generic, as indicated in FIG. 5 as being another threshold "C days". The main point is that a predetermined period of time after the closing records are checked to determine whether or not there has been sale activity after closing. If the response to the query in step S58 is negative, then in step S60 no reply is sent, or a confirmation is replied with no alert indicated therein. Alternatively if the response to the query in step S58 is affirmative the process proceeds to step S62 where another query is made regarding whether the matching record is different than the closed short sale. If the response to the query in step S62 is negative (meaning that it is the same record) then no alert is generated or a confirmation reply is made with no alert reported in the confirmation message in step S64. Alternatively if the response to the query in step S62 is affirmative the process proceeds to step S66 where an alert is generated.

Figure 6:
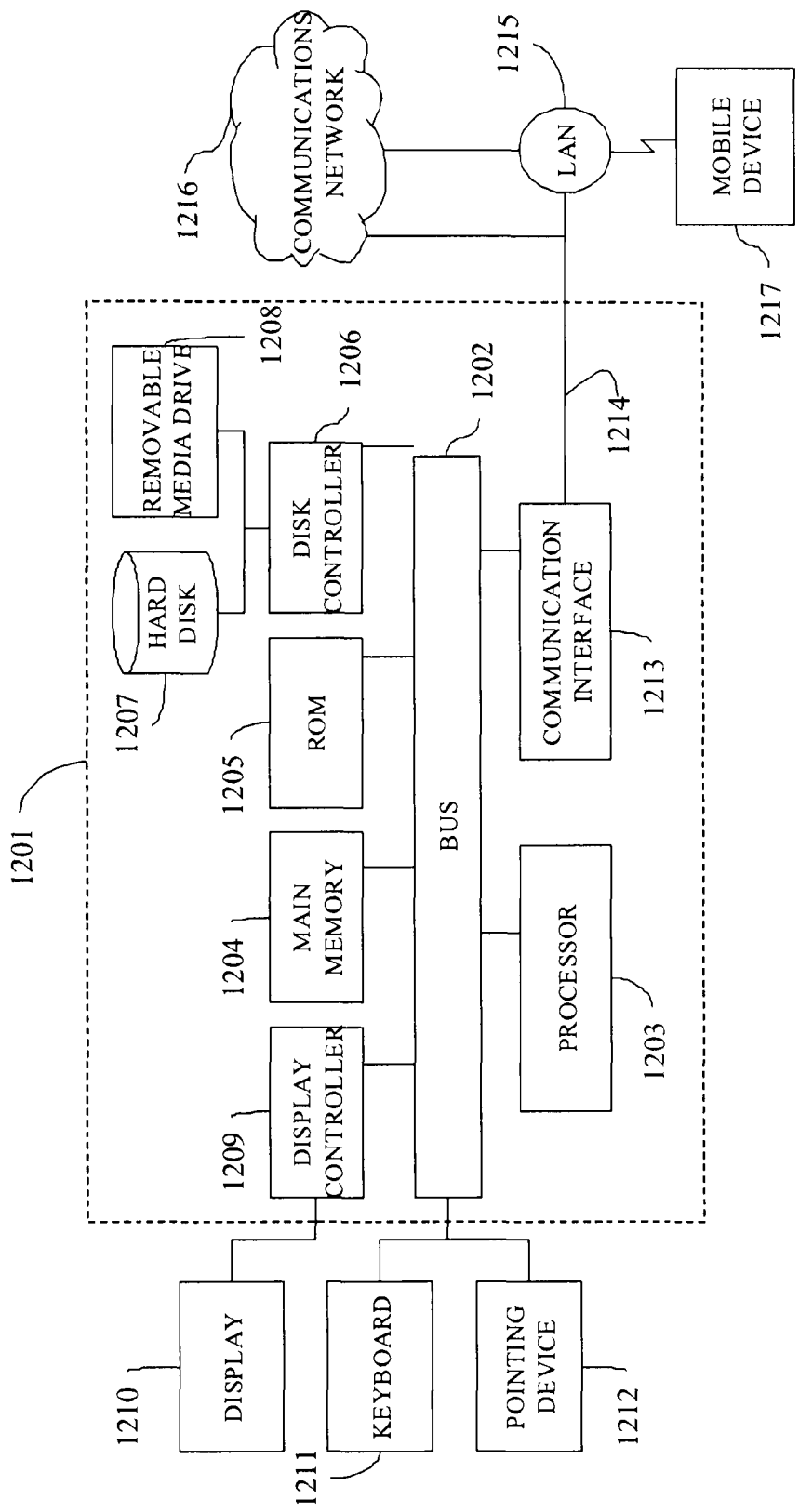
FIG. 6 is a block diagram of a computing platform that may be used according to the embodiments disclosed herein.

FIG. 6 illustrates a computer system 1201 upon which an embodiment of the present invention may be implemented. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1201, for driving a device or devices for implementing the invention, and for enabling the computer system 1201 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 1203 for execution. A computer readable medium may take many forms, including but not limited to, non-volatile media, and volatile media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

In one embodiment, the method and system collects or receives various data from a user. In the preferred embodiment, the user provides information pertaining to: (i) property address; (ii) proposed sale price of property; (iii) loan number identifier; (iv) short sale status (pending/closed); (v) status date (date status was provided); and (vi) outstanding balance. Of course, the system and method may still operate with some of the fields mentioned above. Furthermore, additional fields might be helpful in detecting fraudulent activity. For example, data relating to: (i) borrower name; (ii) selling agent; (iii) title company, escrow agents, settlement agents; and (iii) appraiser and appraisal amount.

Obviously, numerous modifications and variations of the present invention are possible in light of the above teachings. It is therefore to be understood that within the scope of the appended claims, the invention may be practiced otherwise than as specifically described herein.

The invention claimed is:

1. A short sale monitoring system, comprising:
an interface;
a processing circuit that
  receives property identification information for a property, a short sale notification regarding a short sale of the property, and a short sale price;
  queries a database of loan records to identify a corresponding loan application for said property, said loan application being at least one of a pending loan application and a closed loan application for said property; and
  generates a notice when
    said short sale price is less than a predetermined amount with respect to a price included in said loan application, and
    a date of said loan application is within a predetermined time of a closing date of the short sale.

2. The system of clam 1, wherein
said processing circuit is further configured to
  query the database regarding a name of an entity included at least one of the loan application and the short sale;
  determine if the entity was involved in a prior fraudulent short sale; and
  generate the notice if the entity is determined to have been involved in said prior fraudulent short sale, wherein said entity being one of a person and a company.

3. The system of claim 1, wherein
said processing circuit is further configured to
  query the database using names of parties to a transaction, including at least one of the loan application and a short sale for another property, and
  providing a listing of said another property when identified in said database query.

4. The system of claim 1, wherein
said closing date of the short sale is a predetermined number of days with respect to when said processing circuit performs said database query; and
said processing circuit repeats said database query at least daily until said closing date.

5. The system of claim 4, wherein
said predetermined number of days is 45 or less.

6. The system of claim 1, wherein
said closing date of the short sale is after said database is populated with a record of the loan application; and
said processing circuit repeats said query for a predetermined number of days after said closing date.

7. The system of claim 6, wherein
said predetermined number of days is 90 or less.

8. The system of claim 1, wherein
said database includes a public records database; and
said query including a query of the public records database.

9. A short sale monitoring method, comprising:
receiving via an interface property identification information for a property, a short sale notification regarding a short sale of the property, and a short sale price;
querying a database of loan records with a processing circuit to identify a corresponding loan application for said property, said loan application being at least one of a pending loan application and a closed loan application for said property; and
generating a notice when
  said short sale price is less than a predetermined amount with respect to a price included in said loan application, and
  a date of said loan application is within a predetermined time of a closing date of the short sale.

10. The method of clam 9, further comprising:
performing a database query regarding a name of an entity included at least one of the loan application and the short sale;
determining if the name of the entity was involved in a prior fraudulent short sale; and
generating a notice if the name of the entity is determined to have been involved in said prior fraudulent short sale, wherein said entity being one of a person and a company.

11. The method of claim 9, further comprising:
performing a database query using names of parties to a transaction, including at least one of the loan application and a short sale for another property, and
providing a listing of said another property when identified in said database query.

12. The method of claim 9, wherein
said closing date of the short sale is a predetermined number of days with respect to when said processing circuit performs said database query; and
repeating said database query at least daily until said closing date.

13. The method of claim 12, wherein
said predetermined number of days is 45 or less.

14. The method of claim 9, wherein
said closing date of the short sale is after said database is populated with a record of the loan application; and
said repeating with said processing circuit said query for a predetermined number of days after said closing date.

15. The method of claim 14, wherein
said predetermined number of days is 90 or less.

16. The method of claim 9, wherein
said database includes a public records database; and
said querying including querying the public records database.

17. A non-transitory computer readable storage device, having instruction stored therein that when executed by a processing circuit cause the processing circuit to perform a method for monitoring a short sale, comprising:
receiving via an interface property identification information for a property, a short sale notification regarding a short sale of the property, and a short sale price;

querying a database of loan records with a processing circuit to identify a corresponding loan application for said property, said loan application being at least one of a pending loan application and a closed loan application for said property; and generating a notice when
- said short sale price is less than a predetermined amount with respect to a price included in said loan application, and
- a date of said loan application is within a predetermined time of a closing date of the short sale.

18. The computer readable storage device, of claim 17 wherein said method further comprising:
- performing a database query regarding a name of an entity included at least one of the loan application and the short sale;
- determining if the name of the entity was involved in a prior fraudulent short sale; and
- generating a notice if the name of the entity is determined to have been involved in said prior fraudulent short sale, wherein said entity being one of a person and a company.

19. The computer readable storage device, of claim 17 wherein said method further comprising:
- performing a database query using names of parties to a transaction, including at least one of the loan application and a short sale for another property, and
- providing a listing of said another property when identified in said database query.

20. The computer readable storage device, of claim 17, wherein
- said closing date of the short sale is a predetermined number of days with respect to when said processing circuit performs said database query; and
- repeating said database query at least daily until said closing date.

* * * * *